July 26, 1932.     N. M. ERDAHL     1,868,972
COLLAPSIBLE CABLE REEL
Filed July 19, 1929
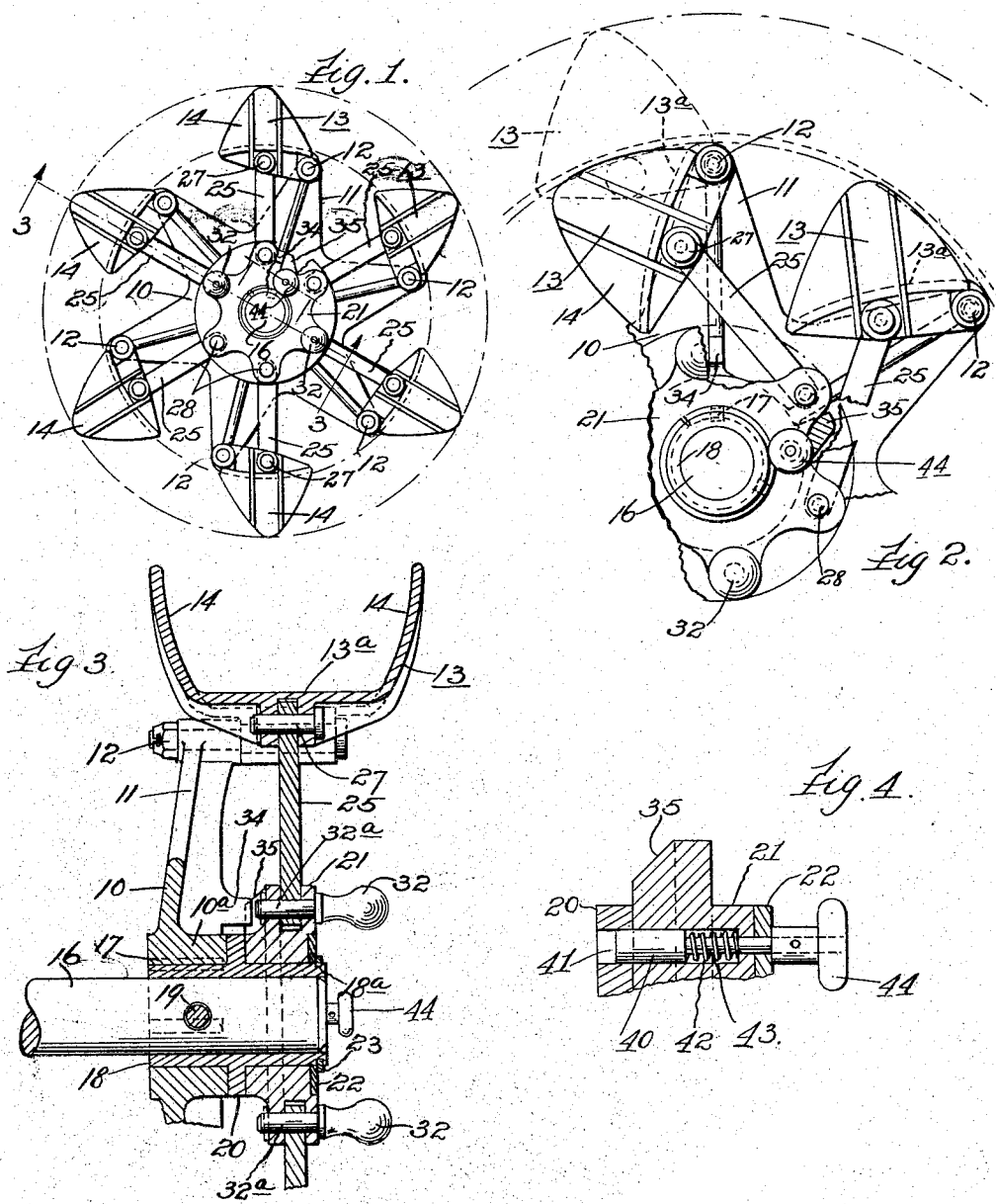
Inventor
Nicholai M. Erdahl
by his Attorneys Patented July 26, 1932

1,868,972

UNITED STATES PATENT OFFICE

NICHOLAI M. ERDAHL, OF EDGERTON, WISCONSIN, ASSIGNOR TO HIGHWAY TRAILER COMPANY, OF EDGERTON, WISCONSIN, A CORPORATION OF WISCONSIN

COLLAPSIBLE CABLE REEL

Application filed July 19, 1929. Serial No. 379,362.

The present invention has reference to reels for coiling wire, cable and the like, and more particularly the invention relates to collapsible reels, and has for its object to produce such a reel of improved and simplified construction that is durable and economical to manufacture. Another object is to provide a collapsible reel of improved design that is relatively compact occupying a minimum space and which does not require additional space when operated. A further object resides in the provision of novel operating mechanism by means of which the reel may be readily collapsed to permit free and easy removal of the coil of wire or cable therefrom. It consists in certain features and elements of construction in combination herein shown and described, as indicated by the claims.

In the drawing:

Figure 1 is a face view of the collapsible reel embodying the present invention.

Figure 2 is an enlarged fragmentary view of a portion of the reel showing the rim segments in collapsed position.

Figure 3 is a transverse section taken through the reel substantially as indicated at line 3—3 on Figure 1.

Figure 4 is a sectional view through the detent by means of which the operating member is releasably secured to the spider.

Referring now in detail to the drawing, the collapsible reel includes a spider 10 having a plurality of spaced, radially extending arms 11; and pivotally connected by bolts 12 to the outer ends of said arms parallel to the axis of rotation of the reel are rim segments 13. The pivotal connection of the rim segments to the spider arms is preferably at one end of each segment so as to provide a wide range of swinging movement therefor. These rim segments may be formed as castings with integral upwardly curved side flanges 14 which serve to confine the wire or cable in coil formation as it is being wound onto the reel segments. It will be understood that the spider carrying the rim segments may be mounted directly on the central drive shaft indicated at 16, or preferable, as herein shown, it is keyed at 17 to a bushing 18, and the bushing together with the spider is rigidly secured to the shaft 16 by a bolt 19 extending transaxially therethrough as shown in Figure 3.

The bushing 18 is provided with an annular flange 20 which abuts against the outer end of the hub 10ª of the spider, and rotatably mounted on said bushing beyond and abutting against the other side of said flange 20 is a segment operating member 21 which is held in position on said bushing by a washer 22 and a split spring ring 23 abutting said washer and engaged in a groove 18ª adjacent the outer end of said bushing. Each of the rim segments is moved into and out of operative position about its pivot by a controlling link 25 pivotally connected at its outer end to a segment and at the inner end to the operating member 21 by means of pins 27 and 28 respectively. The operating member is normally rotatable with the spider 10, but is arranged to permit a limited amount of independent rotation with respect to said spider, as will hereinafter appear.

It will now be apparent that by rotating this operating member on the bushing, the controlling links cause the rim segments 13 to collapse by swinging about their pivot bolts 12 in an inward direction in planes substantially perpendicular to the axis of rotation of the spider or reel proper. The dimensions of the cooperative parts of the mechanism are such that when the operating member 21 has been rotated and the rim segments collapsed, the flanges 14 of said rim segments will lie slightly within the normal effective reel diameter so as to offer no obstruction to the removal of the coil of wire or cable therefrom. It will be noted that the curved bottom 13ª of each rim segment terminates adjacent the pivot axis of the bolt 12 in an eccentric formation; when the rim segments are rotated to their inward or collapsed position, the supporting surfaces 13ª are swung entirely within the normal effective diameter of the reel proper, and the smaller parts of the eccentric portions are disposed outwardly toward the interior of the coil thus insuring ample clearance to permit free removal of the coil bodily from the reel.

For convenience in rotating the operating member or hub 21, I provide a pair of spaced laterally extending handle members 32 provided with shanks 32ª which are substituted for two of the pins 28 for securing the respective controlling links 25 to said operating member. On one of the spider arms 11 is formed a stop lug 34 adapted to be engaged by a cooperating lug 35 carried on the inner side of the operating member 21, for limiting the rotation of the operating member relative to the spider. These interengaging lugs are so related that when they are in abutting position, the spider and operating member are so disposed that the controlling links 25 are in substantially radial arrangement with respect to the drive shaft 16, as shown in Figure 1, for supporting the rim segments in extended or operative position. This provision of the stop lugs prevents the controlling links from being moved beyond radial position and buckling in the opposite direction.

In order to maintain the operating member and spider in proper relation with the rim segments in operative position, I provide suitable detent mechanism which includes a plunger 40 slidably engageable in a cooperatively formed aperture 41 in the flange 20 of the bushing and yieldingly maintained in operative position by a coil spring 42 which is housed in the operating member 21, encompassing the shank or stem 43 of the plunger. This stem extends laterally outward through said operating member and is provided at its end with an operating handle 44 which may be manipulated at will for releasing the operating member 21 for rotation independently of the spider to permit collapsing of the rim segments.

Although reels of this type may be applied to various uses, they are particularly adapted for use in connection with telephone and telegraph line reconstruction or dismantling, and in such cases the reel is ordinarily mounted on a vehicle and is driven from some suitable power source. For practical purposes the reel usually is mounted adjacent the side of the body of the vehicle, and it is therefore very important that the reel proper be relatively compact, and it is especially advantageous if it will not require any more space laterally when collapsed than when in operative position. Thus the possibility of its being damaged or causing damage to other vehicles on the highway is considerably reduced.

I claim:

1. A coil for coiling wire comprising in combination with a rotatably mounted carrier, reel heads having arcuate seats for the wire coil each pivoted to the carrier at one end of the arcuate seat, and means mounted on the carrier operable at will for adjusting and holding the reel heads with their arcuate seats in circumferential alignment, said means being arranged to swing the heads about their pivots to withdraw their arcuate seats inwardly with respect to the circle of said circumferential alignment, the reel heads having lateral flanges for retaining the wire coil, said flanges being tapered in width from the pivoted end of the arcuate seat widening toward the free end to conform approximately to the inner circumference of the wire coil as determined by the circumferentially aligned arcuate seats when the pivoted heads are swung inwardly a substantial distance for releasing the wire coil.

2. A reel for wire cable and the like comprising in combination with a spider arranged for mounting on a shaft for rotation thereby, laterally flanged arcuate reel heads pivoted at one end of their arcuate form to the spider arms at the outer ends of the latter; a control member mounted adjacent to and rotatable about the axis of said spider, and operating connections from said control member for holding the reel heads with their arcuate seats in circumferential alignment, and adapted for swinging them about their pivots inwardly to withdraw the flanges at least at one side within the circle of circumferential alignment of said arcuate seats.

NICHOLAI M. ERDAHL.